United States Patent [19]
Sugiyama

[11] Patent Number: 5,357,814
[45] Date of Patent: Oct. 25, 1994

[54] METHOD OF DETECTING ENGAGEMENT/DISENGAGEMENT CHARACTERISTIC OF CONNECTOR AND APPARATUS THEREFOR

[75] Inventor: Yasushi Sugiyama, Yokkaichi, Japan

[73] Assignee: Sumitomo Wiring Systems, Ltd., Japan

[21] Appl. No.: 73,503

[22] Filed: Jun. 9, 1993

[30] Foreign Application Priority Data

Jun. 11, 1992 [JP] Japan ................................. 4-179254

[51] Int. Cl.$^5$ ................................................ G01B 5/30
[52] U.S. Cl. ................................................ 73/865.9
[58] Field of Search ................. 73/865.3, 865.8, 865.9, 73/794, 796, 818, 826, 827, 831, 833, 836, 862.44, 862.541, 862.542

[56] References Cited

U.S. PATENT DOCUMENTS 3,945,248 3/1976 West ..................................... 73/827
5,011,200 4/1991 Glancy et al. ................... 73/862.541

FOREIGN PATENT DOCUMENTS 296124 12/1990 Japan .
194633 7/1992 Japan .
2179506 3/1987 United Kingdom .

OTHER PUBLICATIONS

English lanuage Abstract for Japanese Uexamined Patent Publication No. 296124/1990.
English lanuage Abstract for Japanese Unexamined Patent Publication No. 194633/1992.

Primary Examiner—Robert Raevis
Attorney, Agent, or Firm—Beveridge, DeGrandi, Weilacher & Young

[57] ABSTRACT

A method of detecting engagement/disengagement characteristics of a less-force required type mating connector, and apparatus therefor. In the less-force required type mating connector, a lever provided in a first connector is pivoted to engage or disengage a second connector with or from the first connector. The first connector is pivoted about a center of pivotal movement of the lever while the pivotal movement of the lever is prevented. A load required to prevent the pivotal movement of the lever is detected. Since the lever is unchanged in its position and angle, the load acting in one direction alone may be detected. Hence, the engagement/disengagement characteristics can be accurately detected.

19 Claims, 10 Drawing Sheets

METHOD OF DETECTING ENGAGEMENT/DISENGAGEMENT CHARACTERISTIC OF CONNECTOR AND APPARATUS THEREFOR

BACKGROUND OF THE INVENTION

1. Field of the Invention

The present invention relates to a method of detecting engagement and disengagement characteristics of a so-called less-force required type mating connector requiring less force in engaging connector members with each other and an apparatus therefor. The less-force required type mating connector is comprised of a first connector having a lever pivotaly held at a specified position and a second connector attachable or detachable to or from the first connector. When the lever pivots relative to the first connector toward a specified engaging direction with the first and second connectors being temporarily engaged with each other, the lever pushes the second connector toward the first connector. Otherwise when the lever pivots in a specified disengaging direction, force is applied to the second connector in a direction for disengagement from the first connector. Thus, it is called as "less-force required type mating connector" in which the second connector can be engaged and/or disengaged to and/or from the first connector by pivoting the lever relative to a first connector.

2. Description of the Related Art

A less-force required type mating connector is comprised of a male connector and a female connector. The male connector and the female connector are attachable or detachable to or from each other. For example, the male connector has a plate-shaped lever which is pivotaly attached about a rotary axis provided in a specified position. The lever has a slit related in a specified position to the rotary axis. When the lever is in its initial position, an opening of the slit is opened to the direction where the female connector is to be attached. A distance between each point of the slit and the rotary axis of the lever is gradually decreased as it lies farther from the opening of the slit toward an inner part thereof. The female connector has a pin fixed in a specified position so that it can fit in the slit formed in the lever.

When the male connector and the female connector is temporarily attached to each other with the lever of the male connector being in its initial position, the pin of the female connector goes into the opening. When the lever is pivoted in a specified engaging direction in this sate, the pin is guided in the slit farther from the opening toward the inner part thereof. This causes a distance between the pin and the rotary axis of the lever to gradually decrease, and eventually, the female connector is engaged with the male connector.

When the lever is pivoted in a direction reverse to the engaging direction, the pin is guided from the inner position of the slit toward its opening. As a result, the distance between the rotary axis of the lever and the pin is gradually increased. This enables the female connector to be disengaged from the male connector.

Thus, a pair of connectors can be engaged/disengaged to or from each other with a small force by pivoting the lever relative to the male connector applying the principle of the lever.

Characteristics of a mating connector are conventionally detected for the purpose of evaluating the characteristics of the mating connector. The characteristics to be detected include characteristics of engagement and disengagement of connector members. When the engagement characteristic is to be detected, a load required in engaging one of the connector members with the other connector members is sequentially detected from a state of temporal attachment of one member to the other till an end of the engagement of them. When the disengagement characteristic is to be detected, the connector members engaged with each other are disengaged from each other while a load required for the disengagement is being sequentially detected.

An ordinary mating connector of which engagement or disengagement is performed by applying a load along an axial direction conventionally has its characteristics detected by using a compression/tensile tester. In detecting an engagement characteristic, a male connector and a female connector are fixed to a pair of chucks of the tester. While the chucks are being put closer to each other, compressive force required is detected to detect the engagement characteristic. In detecting a disengagement characteristic, the male and female connectors which are already engaged with each other are fixed to the pair of chucks of the tester. While the chucks are being set apart from each other, tensile force required is detected to detect the disengagement characteristic.

However, the above-mentioned technology employing the compression/tensile tester cannot be used in detecting characteristics of the less-force required type mating connector. This is because, in the less-force required type mating connector, force applied to the lever in engagement/disengagement of the male and female connectors is not along a direction of displacement of each connector but is changed along an outer periphery about the center of a rotary axis of the lever. Nevertheless, all that the compression/tensile tester can do is causing compressive force and tensile force in an axial direction and therefore is detecting a load in that direction. Thus, the compression/tensile tester cannot be used for detecting the characteristics of the less-force required type mating connector.

SUMMARY OF THE INVENTION

It is the first object of the present invention to provide a method of well detecting an engagement characteristic of a less-force required type mating connector.

It is the second object of the present invention to provide a method of well detecting a disengagement characteristic of the less-force required type mating connector.

It is the third object of the present invention to provide an apparatus for well detecting the engagement characteristic of the less-force required type mating connector.

It is the fourth object of the present invention to provide an apparatus for well detecting the disengagement characteristic of the less-force required type mating connector.

In the present invention in order to attain the above objects, a first connector is pivoted about a center of pivotal movement of its lever while a second connector is temporarily attached to the first connector. At this time, the pivotal movement of the lever is prevented, and a load required to prevent the pivotal movement of the lever is detected. Thus, pivoting the first connector results in the lever being pivoted relative to the first connector in a specified engaging direction. Consequently, the second connector is engaged with the first connector. The load required to prevent the pivotal movement of the lever in this engagement process is nothing but a load applied to the lever in an ordinary engagement operation performed through the pivotal movement of the lever.

The lever is unchanged in its position and angle in the engagement process, and therefore, the load for preventing the pivotal movement of the lever acts in a fixed direction. Thus, since the load can be accurately detected, the engagement characteristic of the mating connector can be detected well.

Similarly, the disengagement characteristic in disengaging the second connector from the first connector can be detected well.

These and other objects, features and effects of the present invention will be more fully apparent from the following detailed description of the preferred embodiments when taken in conjunction with the accompanying drawings.

DESCRIPTION OF PREFERRED EMBODIMENTS

Figure 1:
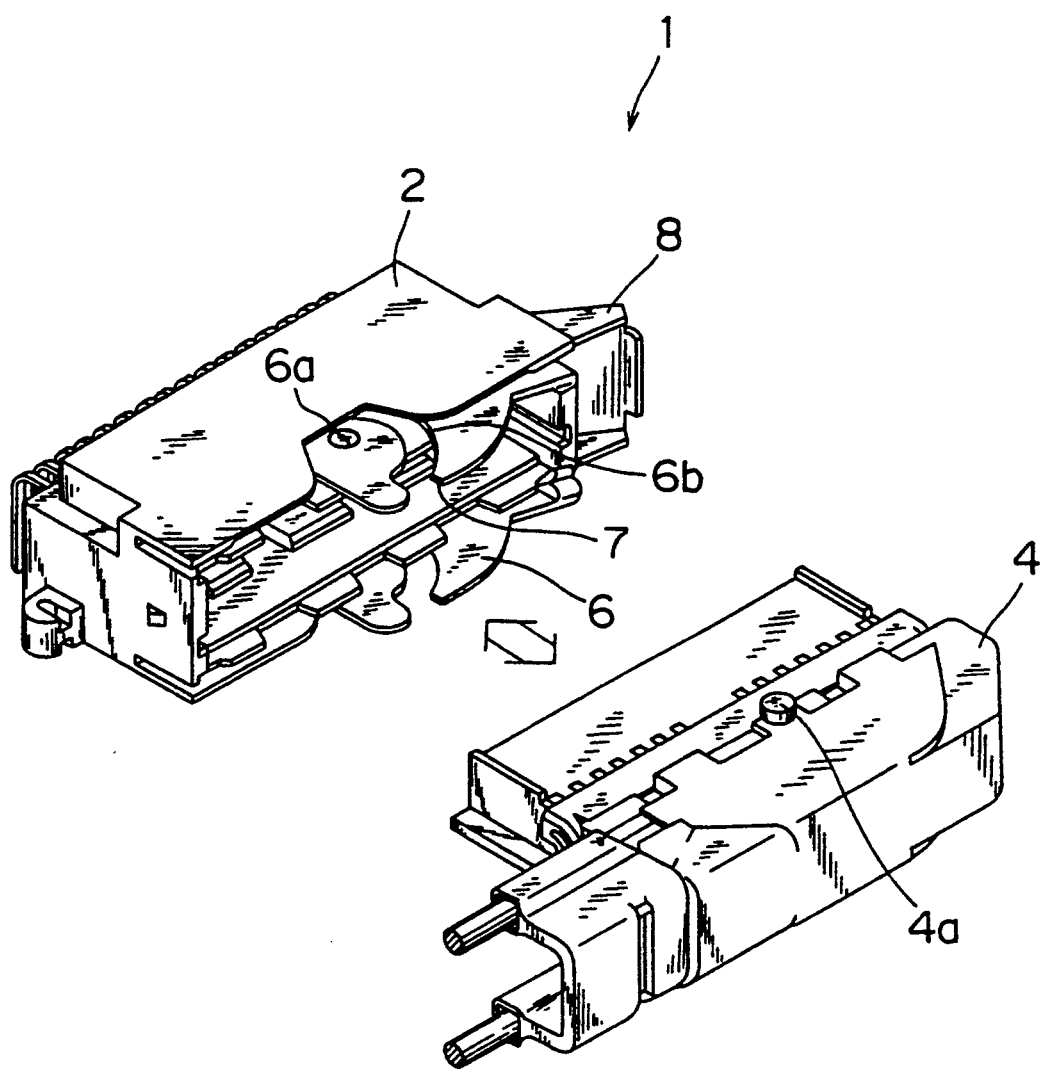
FIG. 1 is a perspective view showing a less-force required type mating connector.

FIG. 1 is a perspective view showing a structure of a less-force required type mating connector whose characteristic is detected by a connector characteristic apparatus of the first embodiment of the present invention. A less-force required type mating connector 1 is comprised of a male connector 2 and a female connector 4 which are attachable or detachable to or from each other.

The male connector 2 has a lever 6. The lever 6 is pivotaly held on a rotary axis 6a fixed in position on the male connector 2. The lever 6 is formed with a curved slit 6b in a specified position related to the rotary axis 6a. With the lever 6 being in its initial position as shown in FIG. 1, an opening 7 of the slit 6b is opened toward the direction where the female connector 4 is to be attached. A distance between each point along the elongated direction of the slit 6b and the rotary axis 6a is gradually decreased as the position lies farther from the opening 7 toward an inner part thereof.

In a specified position of the female connector 4, a pin 4a on which the slit 6a of the lever 6 can fit is fixed.

Figure 2:
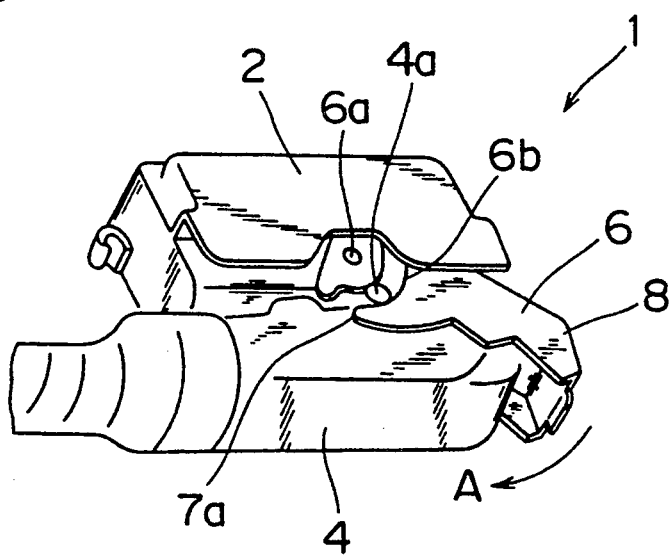
FIG. 2 is a perspective view illustrating a procedure of engaging the connector members of the less-force required type mating connector with each other.

FIG. 2 is a perspective view illustrating a procedure of engaging the female connector with the male connector 2. First, with the lever 6 being in its initial position, the male connector 2 and the female connector 4 are temporarily attached to each other. In this attachment, the pin 4a is put into the slit 6b from the opening 7. At this stage, the lever 6 is pivoted in an engaging direction of arrow A, and this causes the pin 4a to slide into the inner part of the slit 6b. As the pin 4a goes farther into the slit, a distance between the pin 4a and the rotary axis 6a is gradually decreased. Consequently, the female connector 4 is pushed by the lever 6 until engaged with the male connector 2.

Figure 3:
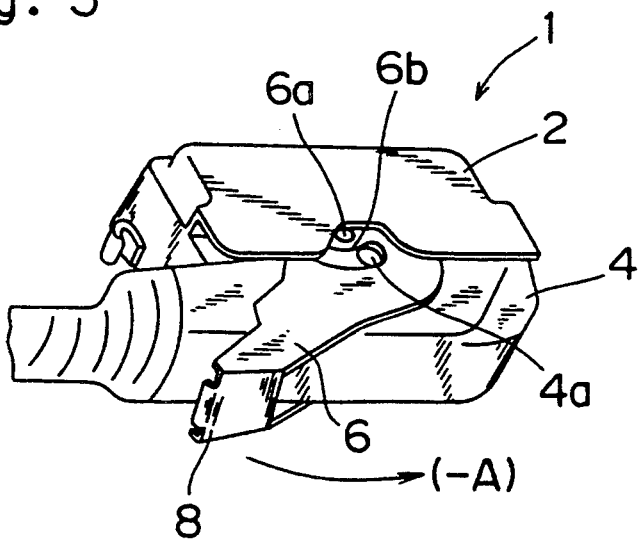
FIG. 3 is a perspective view illustrating a procedure of disengaging the connector members of the less-force required type mating connector from each other.

FIG. 3 is a perspective view illustrating a procedure of disengaging the female connector 4 from the male connector 2. The lever 6 is pivoted from its terminal position illustrated in FIG. 3 into a disengaging direction —A reverse to the engaging direction A, and this causes the pin 4a to move from the inner part of the slit 6b to the opening 7. As the pin 4a slides in the slit, the distance between the rotary axis 6a and the pin 4a is gradually increased. Eventually, the female connector 4 is disengaged from the male connector 2.

Figure 4:
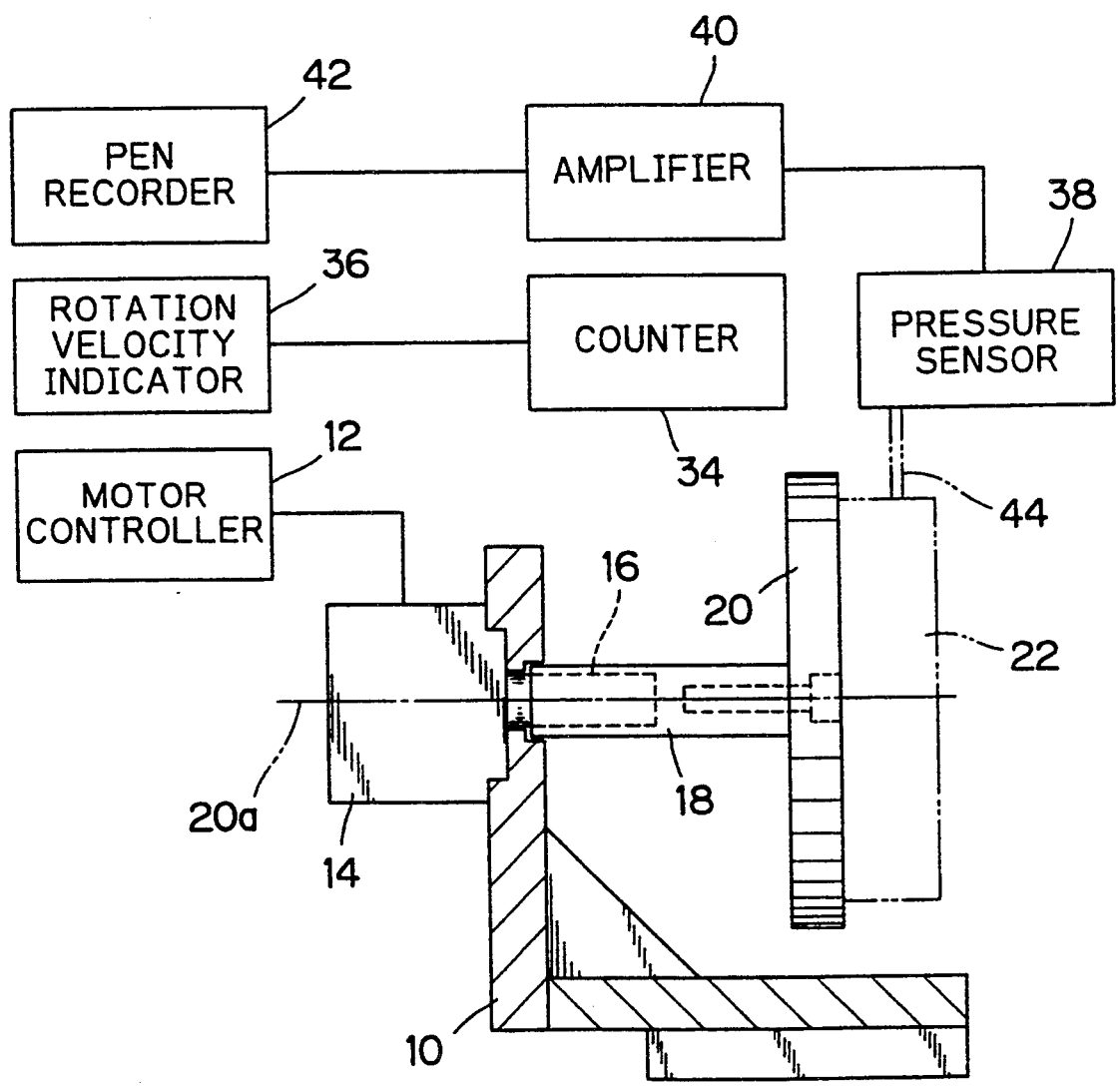
FIG. 4 is a diagram showing an exemplary structure of a connector characteristic detecting apparatus of an embodiment according to the present invention.

FIG. 4 is a diagram showing an exemplary structure of a connector characteristic detecting apparatus for detecting engagement/disengagement characteristics of the above-mentioned less-force required type mating connector. This detecting apparatus includes a body 10 which has a motor 14 serving as a driving means mounted therein. The motor 14 can cause forward and reverse rotations in accordance with a control signal received from a motor controller 12. A rotary plate 20 is combined with a rotary shaft 16 of the motor 14 with a coupling element 18 being interposed therebetween. A connector positioning mechanism 22 which can position and fix the male connector 2 (not shown in FIG. 4) is attached to the rotary plate 20. Thus, in this embodiment, the rotary plate 20 and the connector positioning mechanism 22 together act as a holding means for holding the male connector 2.

A pressure sensor 38 is provided as a load detecting means in the vicinity of the rotary plate 20. The pressure sensor 38 has its detecting unit coupled by an appropriate connecting member 44 to the lever 6 of the male connector 2 fixed to the rotary plate 20. A load applied to the lever 6 is transmitted to the detecting unit of the pressure sensor 38 by the connecting member 44. The load is detected by the pressure sensor 38, and a corresponding electric signal is outputted. The electric signal outputted by the pressure sensor 38 is amplified by an amplifier 40. An output signal from the amplifier 40 is applied to a pen recorder 42 acting as a recording means. The pen recorder 42 records the load applied to the lever 6 on a chart.

Additionally, in the vicinity of the rotary plate 20, a counter 34 is provided. The counter 34 measures a rotation velocity of the rotary plate 20 and produces an electric signal corresponding to the velocity. The electric signal is applied to a rotation velocity indicating unit 36. The rotation velocity of the rotary plate 20 is equivalent to a rotation velocity of the male connector 2 fixed to the rotary plate 20, and therefore, the rotation velocity of the male connector 2 is measured and indicated in the indicating unit 36.

Figure 5:
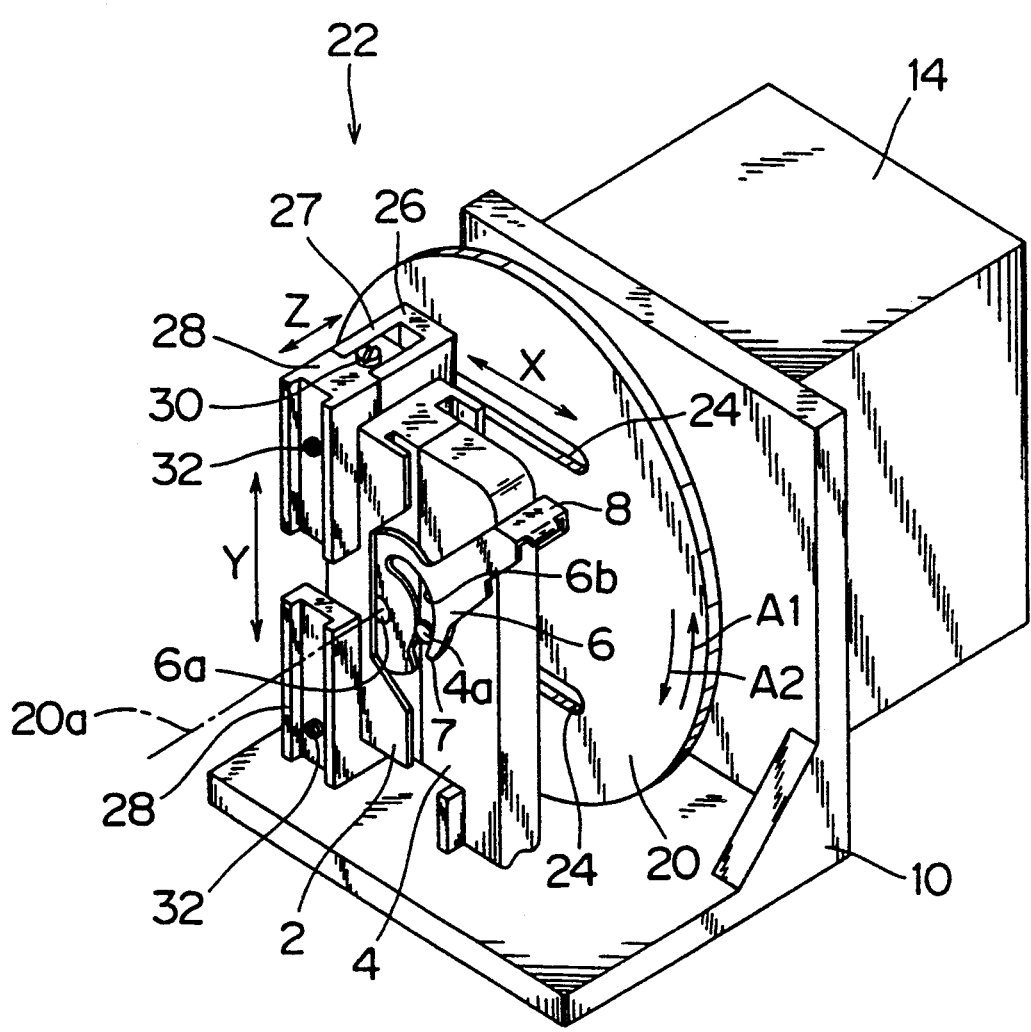
FIG. 5 is a perspective view showing a configuration of a connector positioning mechanism.
Figure 6:
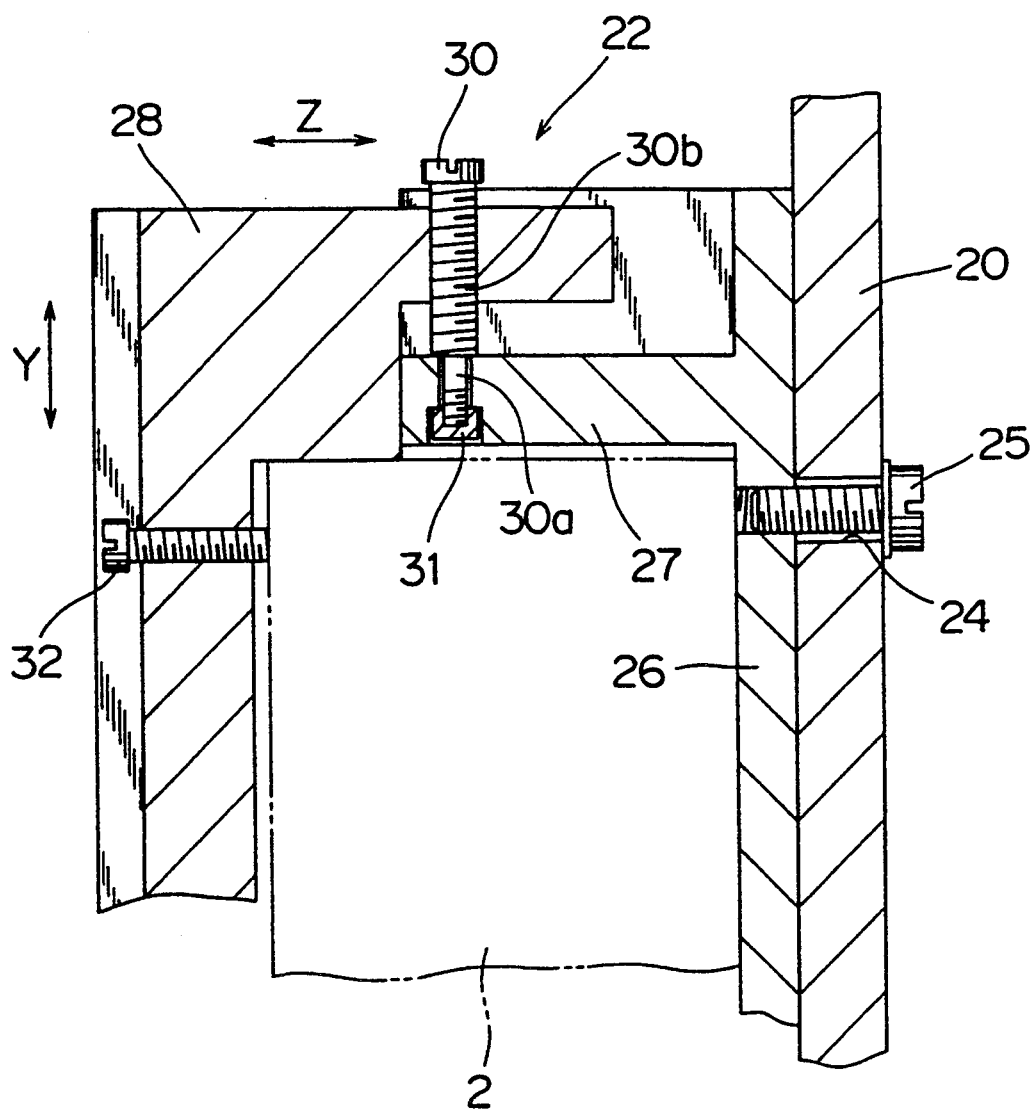
FIG. 6 is a sectional enlarged view showing part of the configuration of the connector positioning mechanism.

FIG. 5 is a perspective view showing a configuration of the connector positioning mechanism 22 mounted on the rotary plate 20. The connector positioning mechanism 22 includes a first member 26 used for positioning with respect to an X-direction along the rotary plate 20 and a pair of second members 28 used for positioning with respect to a Y-direction along the rotary plate 20. The X- and Y-directions are orthogonal to each other. FIG. 6 depicts an enlarged configuration of the first member 26 and therearound.

The first member 26 is slidably fitted to a pair of apertures 24 formed in the rotary plate 20. The pair of apertures 24 extend along the X-direction in parallel to each other. The first member 26 is attached to the rotary plate 20 by a pair of bolts 25 penetrating through the pair of apertures 24 in such a manner that an elongated extension of the first member 26 corresponds to the Y-direction. Tightening the bolts 25 allows prevention of a sliding movement of the first member 26. In addition to that, a pair of mounting portions 27 to which the second members 28 are fixed are provided at opposite ends of the first member 26.

The pair of second members 28 are L-shaped and fixed to the pair of mounting portions 27, opposed to each other so that part of the male connector 2 can be fitted therein. More specifically, a bolt 30 is threaded through each of the second members 28 along the Y-direction. The bolt 30 is composed of a small diameter portion 30a close to the head of the bolt on one end and a large diameter portion 30b on the other end. The larger diameter portion 30b is threaded through the second member 28. A step between the small diameter portion 30a and the large diameter portion 30b is in contact with a surface of the mounting portion 27. The small diameter portion 30a has a screwthread, and a cap nut 31 is fitted on an end of the small diameter portion 30a. In this way, the bolt 30 is rotatably attached to the mounting portion 27 so that movement of the bolt 30 toward its axial direction is prevented. The bolt 30 and the cap nut 31 rotate together.

Thus, rotating the bolt 30 permits the second member 28 to slide in the Y-direction.

The second member 28 is further threaded with a bolt 32 along a Z-direction orthogonal to the X- and Y-directions. The bolt 32 extends through the second member 28 so that its end can be in contact with the male connector 2.

The attachment and positioning of the male connector 2 to the connector positioning mechanism 22 are performed in the following way. Part of the male connector 2 is first tightly held by the first member 26 and the second members 28. Then, the bolt 30 provided in each of the pair of the second members 28 is rotated to position the male connector 2 with respect to the Y-direction. After the positioning about the Y-direction is completed, the bolt 32 for each second member 28 is tightened to fix the male connector 2. Then, the first member 26 is slid in the X-direction for positioning, and the bolts 25 are tightened from the rear side of the rotary plate 20 so that the sliding movement of the first member 26 is prevented. In this way, the male connector 2 is positioned with the rotary axis 6a of the lever 6 positioned on a rotation axis 20a of the rotary plate 20.

The male connector 2 can be positioned and fixed to the rotary plate 20 by alternative means, i.e., by using adhesive agent, instead of the above-mentioned connector positioning mechanism.

Figure 7:
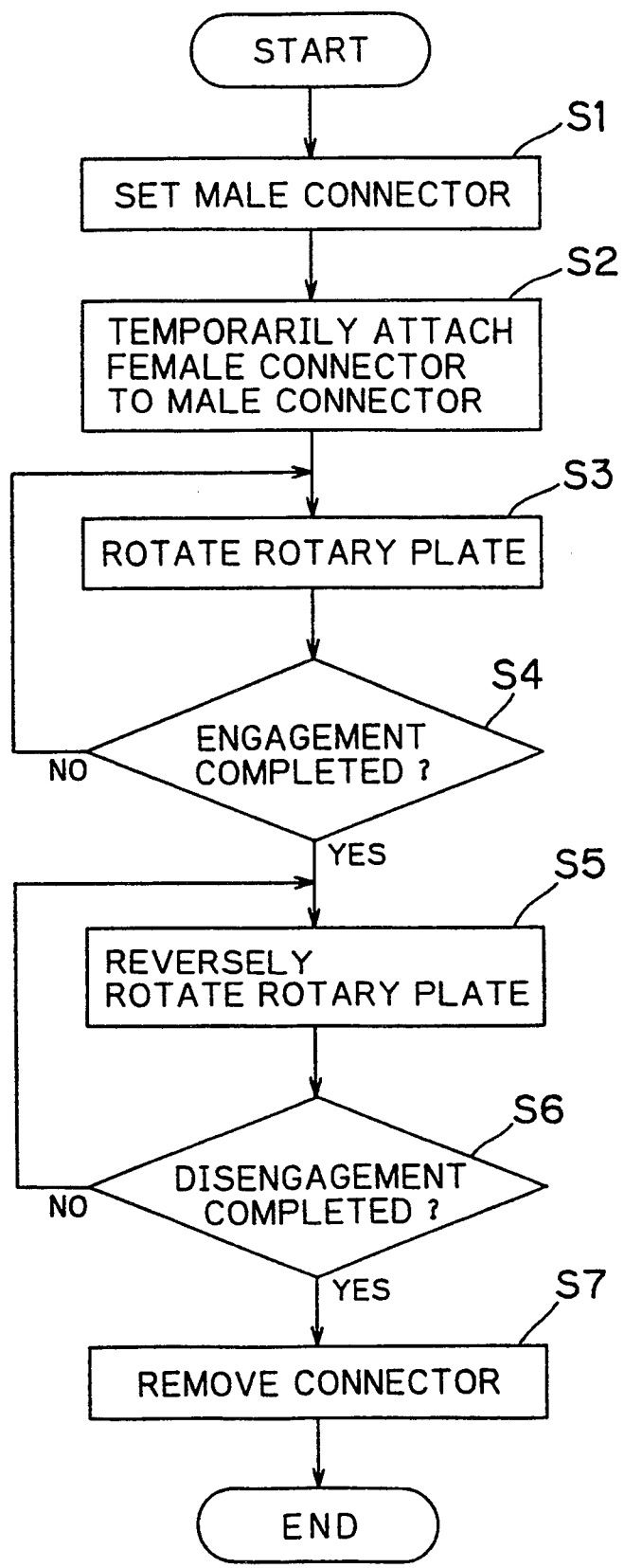
FIG. 7 is a flow chart illustrating a procedure of detecting engagement/disengagement characteristics of the less-force required type mating connector.
Figure 8A:
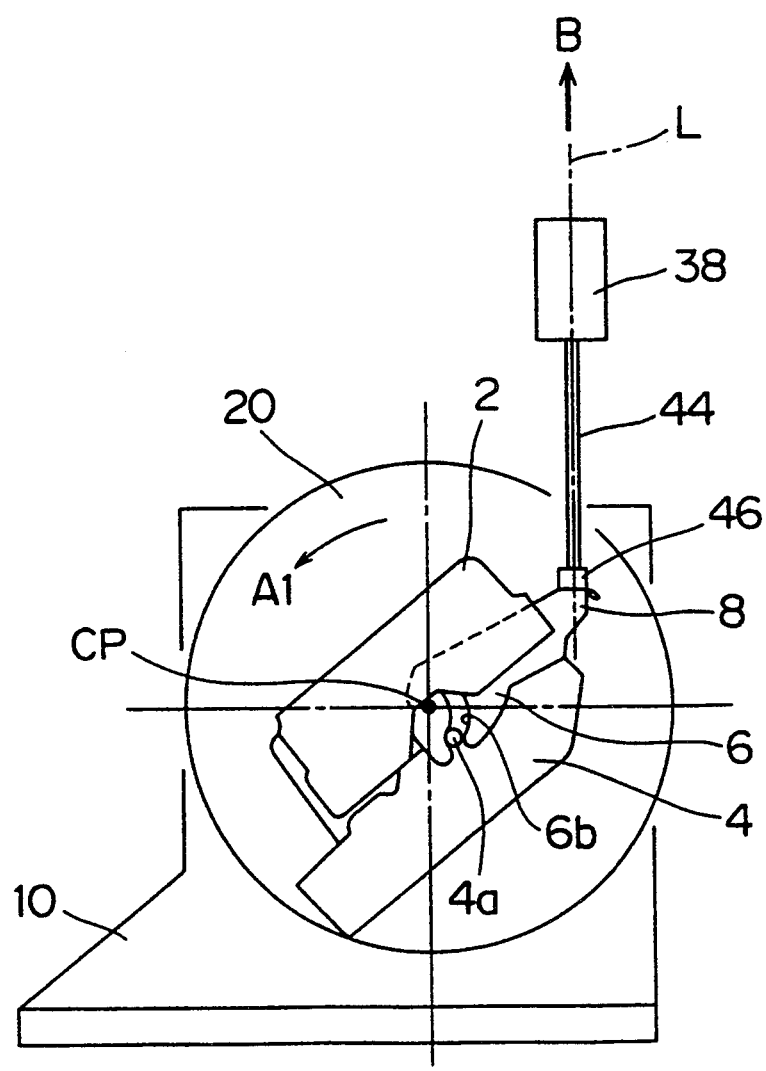
FIGS. 8A and 8B are simplified views illustrating a state of the apparatus in detecting the engagement characteristic.
Figure 8B:
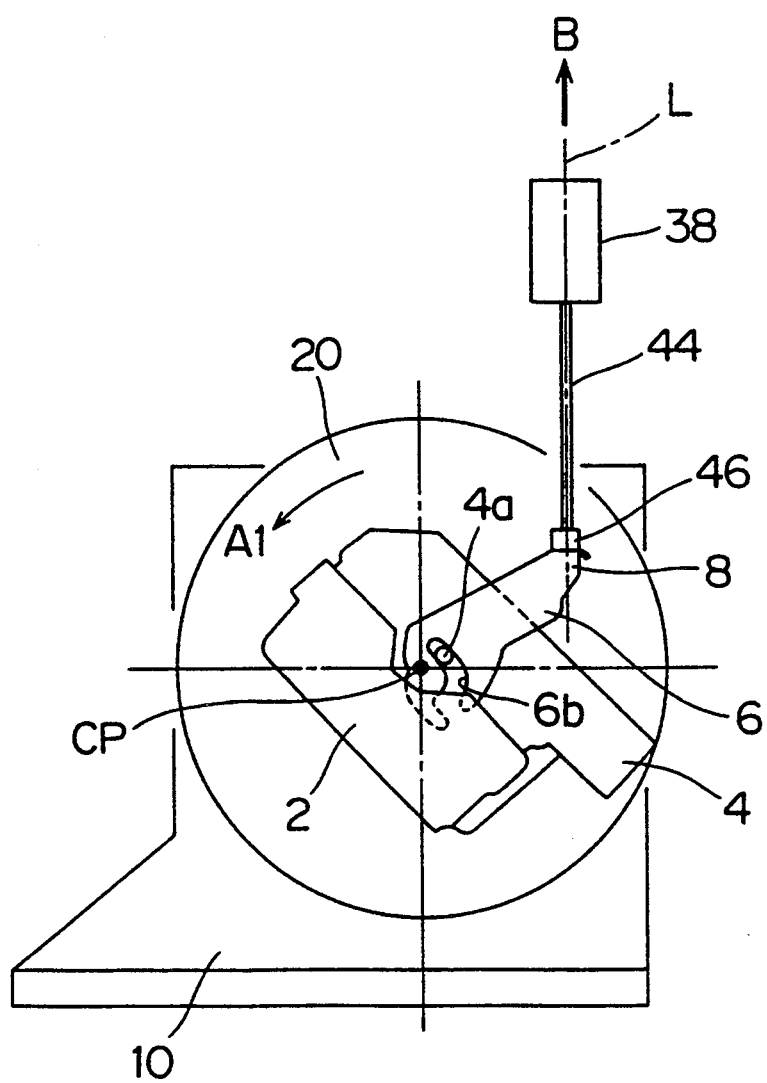

FIG. 7 is a flow chart illustrating a procedure of detecting an engagement characteristic and a disengagement characteristic of the less-force required type mating connector. In this embodiment, the engagement characteristic is first detected, and subsequently the disengagement characteristic is detected. FIGS. 8A and 8B depict simplified states of the apparatus just before the beginning of the detection of the engagement characteristic and in the midst of the detection.

First the male connector 2 is positioned in the rotary plate 20 (Step S1). At this step, as shown in FIGS. 8A and 8B, the connector positioning mechanism 22 is adjusted so that a center of pivotal movement CP of the lever 6 is positioned in the rotation axis 20a of the rotary plate 20.

Figure 9A:
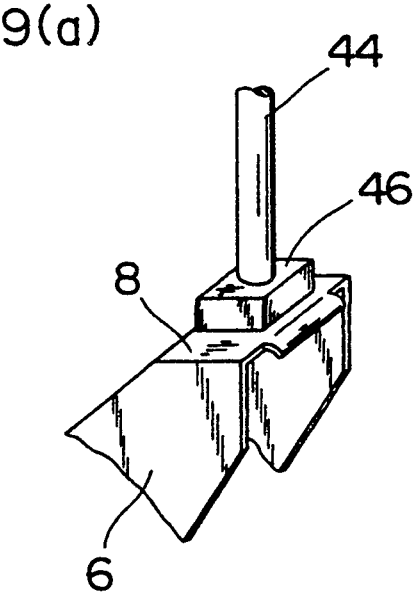
FIGS. 9(a) and 9(b) are enlarged views showing an end of a connecting element.

Then, the pressure sensor 38 is coupled to the lever 6 by the connecting member 44. A pusher 46 as shown in FIG. 9(a) is fixed at an end of the connecting member 44 close to the lever 6. It is desirable that the pressure sensor 38, the connecting member 44 and an end 8 (a loaded point) of the lever 6 all lie in a straight line L corresponding to a direction B of a load applied by the connecting member 44 in order to accurately detect the load applied to the lever 6.

Next the female connector 4 is temporarily attached to the male connector 2 (Step S2). After that, the operator gives an appropriate command value to the motor controller 12. This allows the motor 14 to drive based upon the command value to rotate the rotary plate 20 in an engaging direction A1 (Step S3). This causes the male connector 2 and the female connector 4 temporarily attached thereto to pivot about the center of pivotal movement CP. During the pivotal movement, the lever 6 is prevented from pivoting by the pusher 46, the connecting member 44 and the pressure sensor 38 and stay unchanged in its position and angle. As a result, the lever 6 receives the load from the connecting member 44 and so forth and pivots relative to the male connector 2. The pivotal movement of the lever 6 causes the pin 4a of the female connector 4 to be guided by the slit 6b of the lever 6, so that the female connector 4 is pushed by the lever 6 to engage with the male connector 2.

In such a process of the engagement of the male and female connectors, the load required to prevent the pivotal movement of the lever 6, or the load acting in the lever 6, is detected by the pressure sensor 38. In the process of the engagement, the lever 6 always keeps its initial state of position and angle, and a direction of the load applied to the lever 6 is always kept in a direction along the straight line L. Then, the load from the lever 6 is transmitted along the straight line L corresponding to the direction B of the applied load to the pressure sensor 38. In this way, the pressure sensor 38 can always accurately detect the load applied to the lever 6 in the engagement process.

Figure 10:
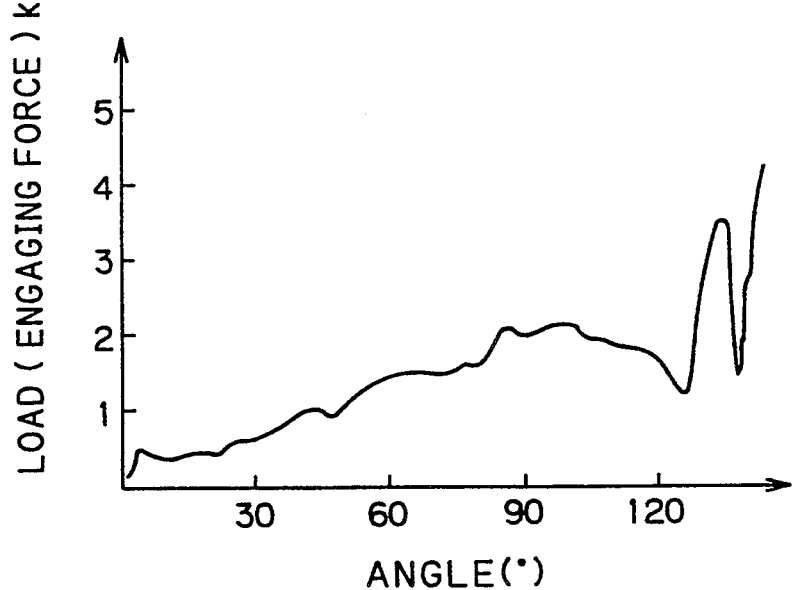
FIG. 10 is a graph showing an example of a record of the engagement characteristic.

The load detected as in the above-mentioned way is recorded on a chart by the pen recorder 42. FIG. 10 depicts exemplary records. FIG. 10 shows results of detections in the event where a chart speed is set to 10 mm/sec and an angular velocity of the rotary plate 20 is set to 6.6°/sec. The horizontal axis represents a rotation angle from an initial state of the rotary plate 20 (that is progress of the engagement) while the vertical axis represents a load applied to the lever 6.

The operator, confirming that the engagement of the male and female connectors is completed (Step S4), applies instruction to stop operation to the motor controller 12. Thus, the detection of the engagement characteristic is completed.

Figure 9B:
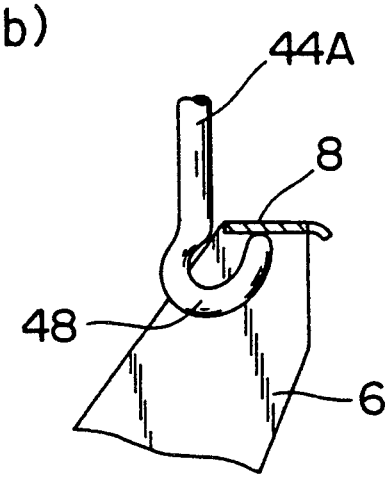

As to a detection of the disengagement characteristic, the connecting member 44 is first removed. Then, as shown in FIG. 9(b), another connecting member 44A having a hook 48 at its end is placed between the pressure sensor 38 and the end 8 of the lever 6. The hook 48 is attached to the end 8 to pull it. If the hook 48 cannot be attached directly to the end of the lever 6, the hook 48 and the lever 6 may be indirectly connected to each other by hard wire (e.g., piano wire, kite string, etc.).

After the connecting member 44 is replaced with the connecting member 44A, the operator applies a command value to reversely rotate the motor 14 to the motor controller 12. This causes the rotary plate 20 to pivot in a disengaging direction A2 (see FIG. 5) reverse to the engaging direction A1 (Step S5). Accordingly, the male connector 2 is pivoted in the direction A2 for the disengagement. At this time, the lever 6 is prevented from pivoting since it is attached to the connecting member 44A; that is, the lever 6 stays unchanged in its absolute position. The lever 6 naturally pivots in the disengaging direction −A relative to the male connector 2 (see FIG. 3). This causes the pin 4a provided in the female connector 4 to be guided from the inner part of the slit 6a formed in the lever 6 toward its opening 7. As a result, force in the direction for the disengagement is applied to the female connector 4, and thus the disengagement of the female connector 4 is completed.

Figure 11:
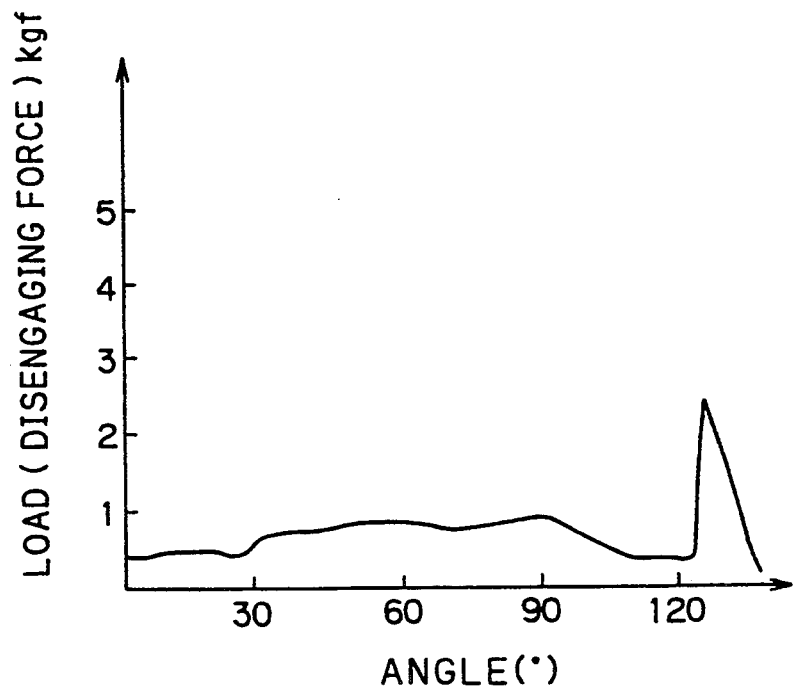
FIG. 11 is a graph showing an example of a record of the disengagement characteristic.

In this disengagement process, the load needed to prevent the pivotal movement of the lever 6, or the load applied to the lever 6, is detected by the pressure sensor 38. The direction of the load applied to the lever 6 in the disengagement process is always in the direction along the straight line L. The load detected by the pressure sensor 38 is, for example as shown in FIG. 11, sequentially recorded on a chart by the pen recorder 42.

The operator, confirming an end of the disengagement operation (Step S6), applies instruction to the motor controller 12 to stop its operation. This causes the motor 14 to stop, and the detection of the disengagement characteristic is completed.

Finally, the connectors 2 and 4 are removed from the rotary plate 20 to complete all procedures (Step S7).

After that, analyzing graphs (see FIGS. 10 and 11) which are recorded by the pen recorder 42), characteristics of the less-force required type mating connector 1 can be evaluated.

As has been described, in this preferred embodiment, the male connector 2 is pivoted under the condition that the lever 6 keeps still in its position and angle, so as to engage/disengage female connector 4 to/from the male connector. Thus, the load applied to the lever 6 is always kept in a specified direction in the engagement/disengagement processes. Thus, the load can be detected well. Moreover, in this embodiment, the pressure sensor 38, the connecting members 44 and 44A, and the end (loaded point) 8 of the lever 6 all lie in the straight line L corresponding to the direction B of the load. Hence, the load from the lever 6 is always transmitted along the straight line L to the pressure sensor 38 in the engagement and disengagement processes, and the load applied to the lever 6 in the engagement and disengagement processes is accurately detected by the pressure sensor 38. Consequently, the engagement and disengagement characteristics of the less-force required type mating connector 1 can be detected with high accuracy.

Although the preferred embodiment of the present invention has been described, the present invention should not be restrictive to the above embodiment. For example, although, in the above embodiment, the disengagement characteristic is detected subsequent to the detection of the engagement characteristic, the engagement characteristic may be detected after the detection of the disengagement characteristic. Also either one of the engagement characteristic and the disengagement characteristic may be detected.

Also in the above embodiment, the operator applies an appropriate command value to the motor controller 12 to conduct the so-called manual operation, but automatic control by a microcomputer is utilized to perform the operation similar to the above case. In such a case, however, the microcomputer is connected to the motor controller 12, the counter 34, and the pressure sensor 38 to operate the whole apparatus in accordance with a program recorded in advance.

Moreover, while a case where characteristics of the less-force required type mating connector 1 having the male connector 2 provided with the lever 6 are detected has been described in the above embodiment, the present invention is similarly applied to a less-force required type mating connector which has a female connector provided with a lever.

Furthermore, while the lever 6 pushes the female connector 4 in both the engagement and disengagement processes in the above embodiment, the present invention can be applied to a detection of characteristics of a mating connector so configured that its lever is to be pivoted for only one of engagement and disengagement operations.

Although the preferred embodiments of the present invention have been described, these are presented for example only to set forth technical subjects of the present invention, and therefore, the present invention should not be restricted to these embodiments nor taken in a narrow sense, and the true spirit and scope of the present invention should be defined by the description of the appended claims.

What is claimed is:

1. A method of detecting an engagement characteristic of a mating connector which is comprised of a first connector having a lever pivotaly held in a specified position and a second connector attachable or detachable to or from said first connector, said lever being pivoted relative to said first connector in a specified engaging direction while said second connector is temporarily attached to said first connector, so as to engage said second connector with said first connector, said method comprising
    pivoting said first connector about a center of pivotal movement of said lever while said second connector is temporarily attached to said first connector;
    preventing the pivotal movement of said lever when said first connector is pivoted, so as to pivot said lever relative to said first connector in said engaging direction; and
    detecting a load required to preventing the pivotal movement of said lever.

2. A method according to claim 1, further comprising recording variations in said load related to a rotation angle of said first connector.

3. A method according to claim 1, further comprising providing a load detecting means for detecting said load; and connecting a loaded point of said lever with said load detecting means by a connecting member to transmit a load acting in the loaded point of said lever via said connecting member to said load detecting means.

4. A method according to claim 3, wherein the loaded point of said lever, said connecting member, and said load detecting means lie in a straight line along a direction of the load acting in said loaded point.

5. A method of detecting a disengagement characteristic of a mating connector which is comprised of a first connector having a lever pivotaly held in a specified position and a second connector attachable or detachable to or from said first connector, said lever being pivoted relative to said first connector in a specified disengaging direction while said second connector is engaged with said first connector, so as to disengage said second connector from said first connector, said method comprising pivoting said first connector about a center of pivotal movement of said lever while said second connector is engaged with said first connector;

preventing the pivotal movement of said lever when said first connector is pivoted, so as to pivot said lever relative to said first connector in said disengaging direction; and detecting a load required to preventing the pivotal movement of said lever.

6. A method according to claim 5, further comprising recording variations in said load related to a rotation angle of said first connector.

7. A method according to claim 5, further comprising providing a load detecting means for detecting said load; and connecting a loaded point of said lever with said load detecting means by a connecting member to transmit a load acting in the loaded point of said lever via said connecting member to said load detecting means.

8. A method according to claim 7, wherein the loaded point of said lever, said connecting member, and said load detecting means lie in a straight line along a direction of the load acting in said loaded point.

9. An apparatus for detecting engagement and/or disengagement characteristics of a mating connector which is comprised of a first connector having a lever pivotaly held in a specified position and a second connector attachable or detachable to or from said first connector, said lever being pivoted relative to said first connector in a specified engaging direction while said second connector is temporarily attached to said first connector, so as to engage said second connector with said first connector, and/or said lever being pivoted relative to said first connector in a specified disengaging direction while said second connector is engaged with said first connector, so as to disengage said second connector from said first connector, said apparatus comprising holding means for pivotaly holding said first connector about a center of pivotal movement of said lever;

driving means for pivoting the holding means about the center of the pivotal movement of said lever;

pivotal movement preventing means for preventing the pivotal movement of said lever when said holding means is pivoted; and load detecting means for detecting a load required to prevent the pivotal movement of said lever.

10. An apparatus according to claim 9, wherein said holding means includes a rotary element pivoted by said driving means and a positioning mechanism for positioning and fixing said first connector related to said rotary element.

11. An apparatus according to claim 9, wherein said driving means can either forwardly or reversely rotate said holding means.

12. An apparatus according to claim 9, further comprising control means for controlling said driving means in order to pivot said holding means so as to pivot said lever relative to said first connector in said engaging direction when said second connector is to be engaged with said first connector.

13. An apparatus according to claim 9, further comprising control means for controlling said driving means in order to pivot said holding means so as to pivot said lever relative to said second connector in said disengaging direction.

14. An apparatus according to claim 9, further comprising recording means for recording results of detection of said load detecting means.

15. An apparatus according to claim 14, wherein said recording means records variations in the detection results of said load detecting means related to a rotation angle of said holding means.

16. An apparatus according to claim 9, further comprising connecting member for connecting a loaded point of said lever and said load detecting means to transmit the load acting in said lever to said load detecting means.

17. An apparatus according to claim 16, wherein the loaded point of said lever, said connecting member, said load detecting means lie in a straight line along a direction of the load acting in said loaded point.

18. An apparatus according to claim 16, wherein said connecting member has a pusher for pushing the loaded point of said lever.

19. An apparatus according to claim 16, wherein said connecting member has a hook for pulling the loaded point of said lever.

* * * * *